United States Patent
Johansson et al.

(10) Patent No.: US 9,189,151 B2
(45) Date of Patent: Nov. 17, 2015

(54) PRE-EMPTIVE CPU ACTIVATION FROM TOUCH INPUT

(71) Applicants: Magnus Johansson, Dösjebro (SE); Björn Davidsson, Lund (SE)

(72) Inventors: Magnus Johansson, Dösjebro (SE); Björn Davidsson, Lund (SE)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 14/019,628

(22) Filed: Sep. 6, 2013

(65) Prior Publication Data

US 2015/0070282 A1 Mar. 12, 2015

(51) Int. Cl.
*G06F 3/041* (2006.01)
*G06F 3/0488* (2013.01)
*G06F 9/50* (2006.01)

(52) U.S. Cl.
CPC .......... *G06F 3/04883* (2013.01); *G06F 9/5083* (2013.01); *G06F 9/5094* (2013.01)

(58) Field of Classification Search
None
See application file for complete search history.

(56) References Cited

U.S. PATENT DOCUMENTS

| 8,368,667 B2 | 2/2013 | Vincent et al. |
| 2011/0320836 A1 | 12/2011 | Johnston et al. |
| 2012/0191993 A1 | 7/2012 | Drader et al. |
| 2012/0210032 A1 | 8/2012 | Wang et al. |
| 2012/0291043 A1 | 11/2012 | Stubbs et al. |
| 2013/0074085 A1* | 3/2013 | Thomson et al. ............. 718/102 |

FOREIGN PATENT DOCUMENTS

WO 2005069151 A1 7/2005

OTHER PUBLICATIONS

International Search Report issued in corresponding PCT application No. PCT/IB2014/063724 mailed on Dec. 4, 2014, 8 pages.

* cited by examiner

*Primary Examiner* — Kenneth B Lee, Jr.
(74) *Attorney, Agent, or Firm* — Tucker Ellis LLP

(57) ABSTRACT

A computing device may include a touchscreen and logic configured to monitor a processing load for a plurality of central processing units at particular intervals and adjust a number of active central processing units, of the plurality of central processing units, based on the monitored processing load. The logic may further be configured to detect a touchscreen event associated with the touchscreen and activate one or more additional central processing units, of the plurality of central processing units, in response to detecting the touchscreen event.

18 Claims, 5 Drawing Sheets

PRE-EMPTIVE CPU ACTIVATION FROM TOUCH INPUT

BACKGROUND INFORMATION

A computer device may include a touchscreen. A touchscreen may function as an input and output device for the computer device. The touchscreen may display information, such as text, images, and/or selection objects. A user may use touch or gestures to make selections or otherwise enter input into the computer device by touching the touchscreen. Low response latency of the touchscreen, along with a high and even frame rate, may improve user experience.

SUMMARY OF THE INVENTION

According to one aspect, a method, performed by a computing device, may include monitoring, by the computing device, a processing load for a plurality of central processing units at particular intervals; adjusting, by the computing device, a number of active central processing units, of the plurality of central processing units, based on the monitored processing load; detecting, by the computing device, a touchscreen event associated with a touchscreen of the computing device; and activating, by the computing device, one or more additional central processing units, of the plurality of central processing units, in response to detecting the touchscreen event.

Additionally, detecting the touchscreen event may include receiving an indication from a touchscreen software process that the touchscreen event was detected.

Additionally, detecting the touchscreen event may include monitoring a kernel driver queue at particular intervals; and detecting an indication of the touchscreen event in the kernel driver queue.

Additionally, the method may include determining a type of touchscreen event associated with the detected touchscreen event; determining whether to activate the one or more additional central processing units based on the determined type of touchscreen event; and the activating may include activating the one or more additional central processing units, in response to determining to activate the one or more additional central processing units.

Additionally, determining the type of touchscreen event associated with the detected touchscreen event may include determining a type of gesture associated with the detected touchscreen event.

Additionally, determining the type of touchscreen event associated with the detected touchscreen event may include determining that the detected touchscreen event is associated with a particular area of the touchscreen.

Additionally, determining the type of touchscreen event associated with the detected touchscreen event may include determining that the detected touchscreen event is associated with a particular type of incoming message.

Additionally, determining the type of touchscreen event associated with the detected touchscreen event may include determining that the detected touchscreen event is associated with a particular application being activated.

Additionally, the method may include adjusting an operating frequency of the computing device, in response to detecting the touchscreen event.

According to another aspect, a computing device may include a touchscreen; and logic configured to monitor a processing load for a plurality of central processing units at particular intervals; adjust a number of active central processing units, of the plurality of central processing units, based on the monitored processing load; detect a touchscreen event associated with the touchscreen; and activate one or more additional central processing units, of the plurality of central processing units, in response to detecting the touchscreen event.

Additionally, when detecting the touchscreen event, the logic may be configured to receive an indication from a touchscreen software process that the touchscreen event was detected.

Additionally, when detecting the touchscreen event, the logic may be configured to monitor a kernel driver queue at particular intervals; and detect an indication of the touchscreen event in the kernel driver queue.

Additionally, the logic may be configured to determine a type of touchscreen event associated with the detected touchscreen event; determine whether to activate the one or more additional central processing units based on the determined type of touchscreen event; and, when activating the one or more additional central processing units, the logic may be configured to activate the one or more additional central processing units, in response to determining to activate the one or more additional central processing units.

Additionally, when determining the type of touchscreen event associated with the detected touchscreen event, the logic may be configured to determine a type of gesture associated with the detected touchscreen event.

Additionally, when determining the type of touchscreen event associated with the detected touchscreen event, the logic may be configured to determine that the detected touchscreen event is associated with a particular area of the touchscreen.

Additionally, when determining the type of touchscreen event associated with the detected touchscreen event, the logic may be configured to determine that the detected touchscreen event is associated with a particular type of incoming message.

Additionally, when determining the type of touchscreen event associated with the detected touchscreen event, the logic may be configured to determine that the detected touchscreen event is associated with a particular application being activated.

Additionally, when determining the type of touchscreen event associated with the detected touchscreen event, the logic may be configured to determine that the detected touchscreen event is associated with a particular level of battery life.

According to yet another aspect, a computing device may include a touchscreen; and logic configured to monitor a processing load for at least one of a plurality of central processing units using a first particular interval; adjust a number of active central processing units, of the plurality of central processing units, based on the monitored processing load; monitor a kernel driver queue using a second particular interval, wherein the second particular interval is smaller than the first particular interval; detect an indication of the touchscreen event in the kernel driver queue; determine whether to activate one or more additional central processing units, of the plurality of central processing units, in response to detecting the indication of the touchscreen event; and activate one or more additional central processing units, of the plurality of central processing units, in response to determining to activate the one or more additional central processing units.

Additionally, the logic may be configured to determine whether to activate the one or more additional central processing units based on at least one of a type of gesture associated with the detected touchscreen event, whether the detected touchscreen event is associated with a particular area of the touchscreen, whether the detected touchscreen event is associated with a particular type of incoming message, whether the detected touchscreen event is associated with a particular application being activated, or whether the detected touchscreen event is associated with a particular level of battery life.

DETAILED DESCRIPTION OF PREFERRED EMBODIMENTS

Figure 1:
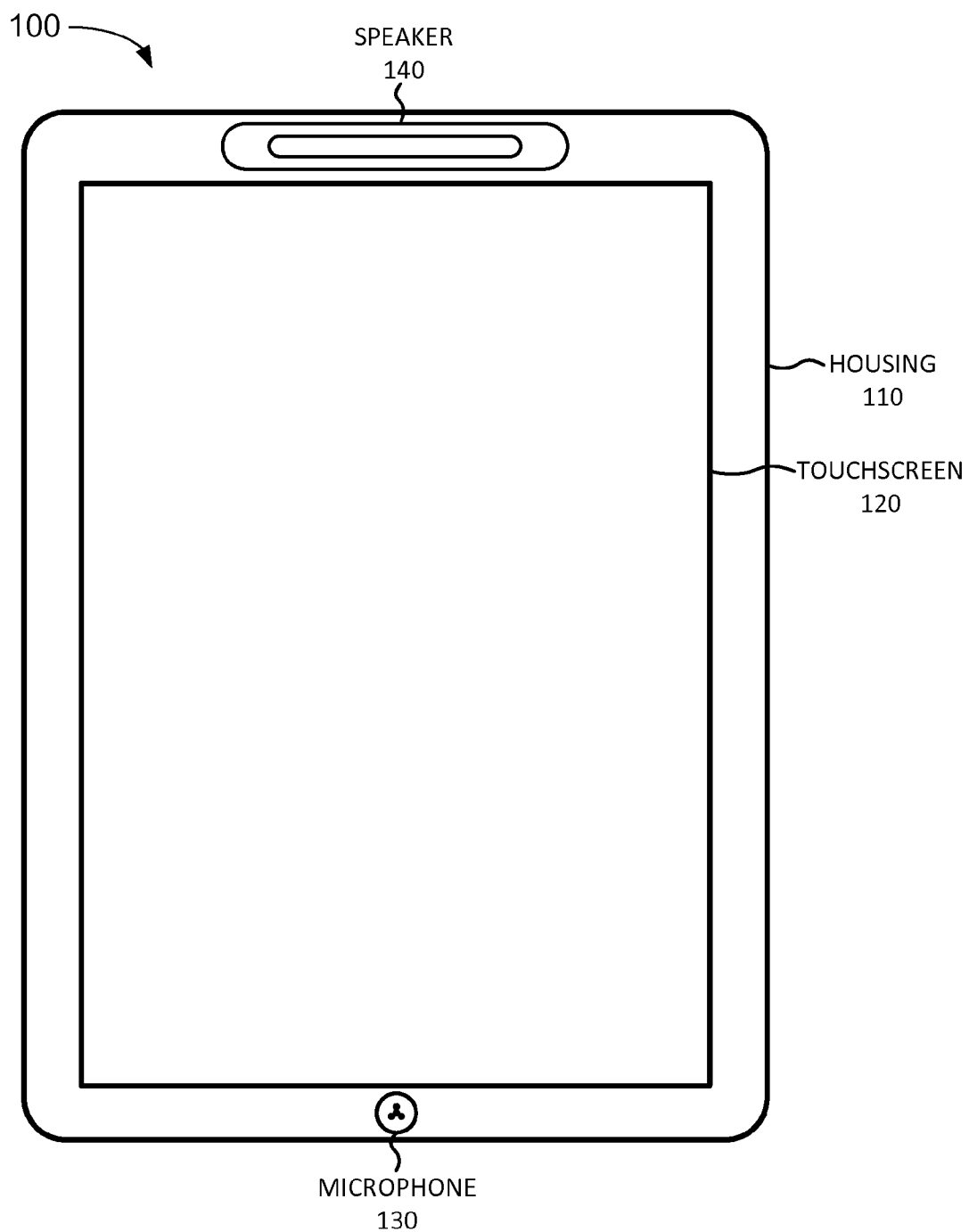
FIG. 1 is a diagram illustrating an touchscreen device according to an implementation described herein.

The following detailed description refers to the accompanying drawings. The same reference numbers in different drawings identify the same or similar elements.

A computer device that includes a touchscreen, such as a tablet computer or a mobile communication device, may include multiple central processing units (CPUs). The number of active CPUs may depend on the processor load of the computer device. For example, when the computer device is idle, only one (or a small number) of CPUs may be active. A CPU decision engine may monitor the CPU processor load of the CPUs at particular intervals and may activate additional CPUs if the processor load increases.

For example, the CPU decision engine may scan the CPU processor load at 50 millisecond (ms) intervals and may average three consecutive readings to determine whether to activate additional CPUs. Thus, in such an implementation, the shortest time before additional CPUs are activated may be 150 ms. If the increased processor load is a result of a touchscreen event (e.g., a user activating a touchscreen via a gesture), before the additional CPUs are activated, the computer device may not have an adequate number of activated CPUs for smooth operation of the touchscreen. Thus, the touchscreen may experience latency issues, resulting in frame drops and/or jerky movement of displayed objects on the touchscreen. While such latency issues may be avoided by keeping additional CPUs active in an idle state, or by sampling the processor load at more frequent intervals, such solutions reduce battery life.

An implementation described herein relates to pre-emptive CPU activation based on touch input. A CPU decision engine may monitor processor load for a set of multiple CPUs in a computer device that includes a touchscreen and may adjust the number of active CPUs based on the monitored processor load. When the CPU decision engine detects a touchscreen event associated with the touchscreen, the CPU decision engine may activate one or more additional CPUs in response to detecting the touchscreen event. Thus, the additional CPUs are activated pre-emptively before an increase in processor load is detected. In some implementations, the number of additional CPUs to be activated may be presented as the number of CPUs that should be active. Thus, for example, a detected touchscreen event may indicate that at least two CPUs should be active. A CPU decision engine may check to see how many CPUs are active and may activate an additional CPU if only one CPU is active, and may not need to activate additional CPUs if two CPUs are already active as a result of another process.

When a touchscreen event occurs, an interrupt may be generated, received by a kernel driver, and placed in a kernel device input queue. The kernel driver may then activate a particular touchscreen function to process the touchscreen event. In some implementations, the CPU decision engine may scan the kernel device input queue at particular intervals to determine whether a touchscreen event has occurred. In other implementations, the CPU decision engine may receive an indication from the kernel driver, and/or from the touchscreen function, that a touchscreen event has occurred. For example, a mechanism for bringing additional CPUs online may be implemented in the kernel driver in response to an interrupt received from a touchscreen integrated circuit (IC) chip. Thus, in some implementation, the activation of additional CPUs in response to a touchscreen event may be interrupt driven, rather than as a result of a monitoring or polling process.

In some implementations, a type of touchscreen event may be determined for the detected touchscreen event and the number of additional CPUs to be activated may be determined based on the type of touchscreen event. For example, different types of gestures may be associated with different types of touchscreen events and a first gesture may not activate any additional CPUs, while a second gesture may activate one additional CPU. A "gesture," as the term is used herein, may refer to any touch pattern, or a sequence of touch patterns, that a user may perform when contacting or touching the touchscreen of a computer device. As an example, a computer device's touchscreen may be unlocked with a double tap. Thus, if a single tap is detected, no additional CPUs may be activated and if a double tap is detected, an additional CPU may be activated.

In some implementations, a type of touchscreen event may be determined based on the number of detected fingers on the touchscreen and/or the number of contact points with the touchscreen. In some implementations, a type of touchscreen event may be determined based on a particular area of the touchscreen. Additionally or alternatively, a type of touchscreen event may be determined based on a detected touchscreen event in combination with a particular event or state of the computer device. For example, determining the type of touchscreen event may include determining whether the detected touchscreen event is associated with a particular processor load, determining whether the detected touchscreen event is associated with a particular type of incoming message, determining whether the detected touchscreen event is associated with a particular application being activated, determining whether the detected touchscreen event is associated with a particular level of battery life, and/or determining whether the touchscreen event is associated with another type of event or state.

In some implementations, CPU frequencies may be tied to a particular operating frequency, such as a minimum operating frequency. Thus, in some implementations, in response to a detected touchscreen event, an operating frequency of the device may be adjusted in conjunction with activating one or more additional CPUs. Furthermore, the operating frequency may depend on different use cases, hardware platforms, and/or user or system configurations. Thus, a detected touch screen event may cause a CPU decision engine to adjust an operating frequency in response to a detected touchscreen event.

FIG. 1 is a diagram of an exemplary computer device 100 according to an implementation described herein. Computer device 100 may include any device with a touchscreen, such as a mobile phone, a smart phone, a phablet device, a tablet computer, a laptop computer, a personal digital assistant (PDA), a media playing device, and/or another type of portable communication device. As shown in FIG. 1, computer device 100 may include a housing 110, a touchscreen 120, a microphone 130, and a speaker 140.

Housing 110 may enclose computer device 100 and may protect the components of computer device 100 from the outside environment. Touchscreen 120 may include a display device that includes an input device configured to detect a user's touch. For example, touchscreen 120 may include a liquid crystal display (LCD), an electronic ink display (e.g., an electrophoretic display), an electroluminescent display, and/or another type of display device. Furthermore, touchscreen 120 may include a set of touch sensors, such as a set of capacitive sensors (e.g., surface capacitive sensors, projected capacitive touch sensors, etc.), a set of resistive sensors (e.g., analog resistive sensors, digital resistive sensors, etc.), a set of optical sensors (e.g., optical imaging sensors, rear diffused illumination sensors, infrared grid sensors, diffused surface illumination sensors, etc.), a set of acoustic wave sensors (e.g., surface acoustic wave sensors, bending wave sensors, etc.), and/or a set of another type of touch sensors. Furthermore, touchscreen 120 may include a set of force sensors to sense an amount of force being applied to touchscreen 120, such as a set of piezoresistive sensors.

Microphone 130 may function as an input device that receives audio signals and converts the received audio signals to electrical signals. Speaker 140 may function as an output device that receives electrical signals and generates audio signals based on the received electrical signals. Computer device 100 may include additional sensors (not shown in FIG. 1). For example, computer device 100 may include one or more tilt sensors, such as accelerometers and/or gyroscopes, configured to sense a tilt, position, and/or orientation in space of computer device 100.

Although FIG. 1 show exemplary components of computer device 100, in other implementations, computer device 100 may include fewer components, different components, differently arranged components, or additional components than depicted in FIG. 1. Additionally or alternatively, one or more components of computer device 100 may perform functions described as being performed by one or more other components of computer device 100.

Figure 2:
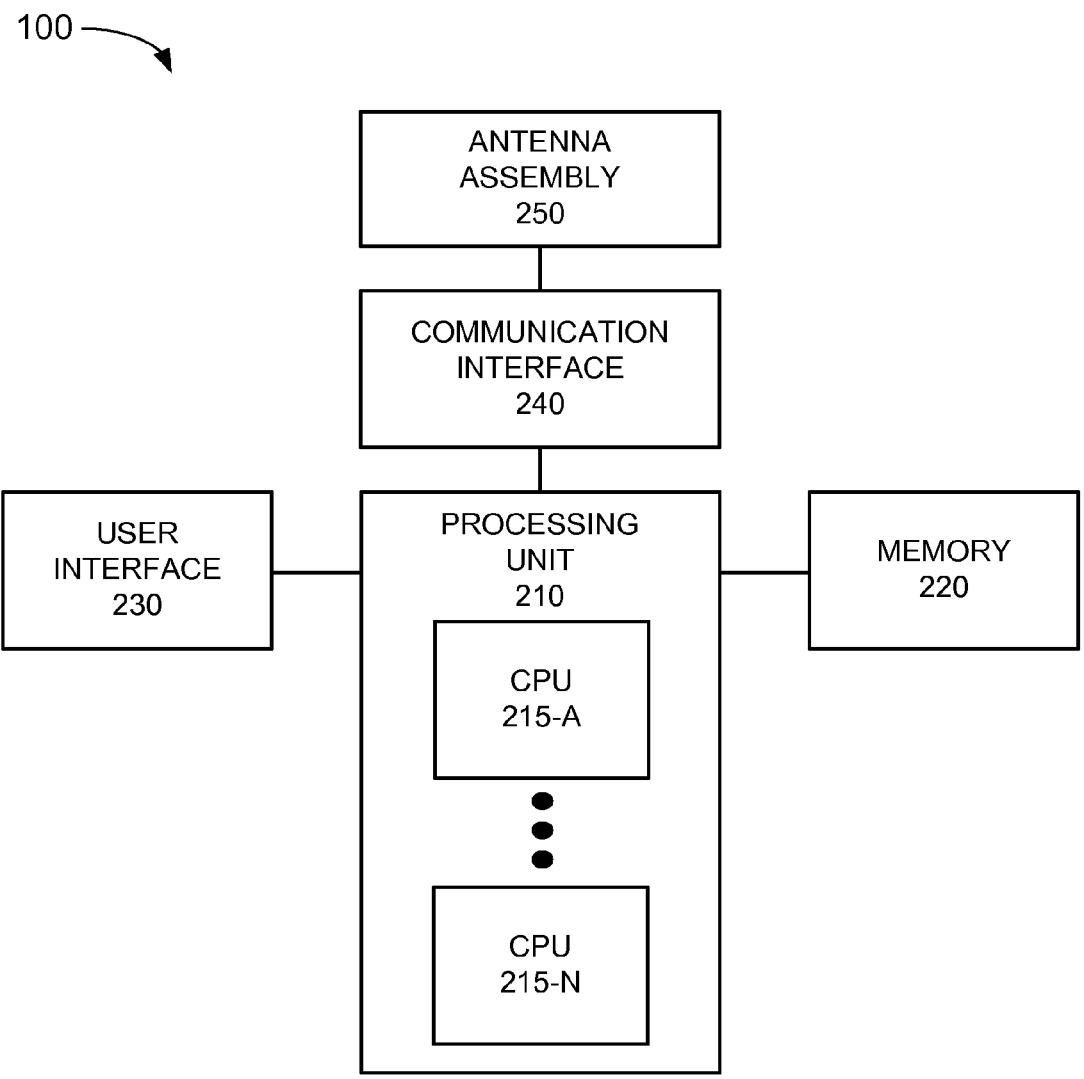
FIG. 2 is a diagram illustrating exemplary components of the touchscreen device of FIG. 1.

FIG. 2 is a diagram illustrating example components of a computer device 100 according to an implementation described herein. As shown in FIG. 2, device 100 may include a processing unit 210, a memory 220, a user interface 230, a communication interface 240, and an antenna assembly 250.

Processing unit 210 may include multiple CPUs 215-A to 215-N (referred to herein collectively as "CPUs 215" and individually as "CPU 215"). Each CPU 215 may include one or more processors, microprocessors, application specific integrated circuits (ASICs), field programmable gate arrays (FPGAs), and/or other processing logic. Processing unit 210 may control operation of computer device 100 and its components.

Memory 220 may include a random access memory (RAM) or another type of dynamic storage device, a read only memory (ROM) or another type of static storage device, a removable memory card, and/or another type of memory to store data and instructions that may be used by CPUs 215.

User interface 230 may include mechanisms for inputting information to computer device 100 and/or for outputting information from computer device 100. Examples of input and output mechanisms might include a speaker to receive electrical signals and output audio signals (e.g., speaker 140); a camera lens to receive image and/or video signals and output electrical signals; a microphone to receive audio signals and output electrical signals (e.g., microphone 130); buttons (e.g., a joystick, control buttons, a keyboard, or keys of a keypad) and/or a touchscreen to permit data and control commands to be input into computer device 100 (e.g., touchscreen 120); a display, such as an LCD, to output visual information (e.g., touchscreen 120); a vibration actuator to cause computer device 100 to vibrate; and/or any other type of input or output device. In some implementations, a user may set criteria for activating/deactivating CPUs 215 based on the user's preferences via user interface 230.

Communication interface 240 may include a transceiver that enables computer device 100 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

As described herein, computer device 100 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of computer device 100, in other implementations, computer device 100 may include fewer components, different components, differently arranged components, or additional components than depicted in FIG. 2. Additionally or alternatively, one or more components of computer device 100 may perform the tasks described as being performed by one or more other components of computer device 100.

Figure 3:
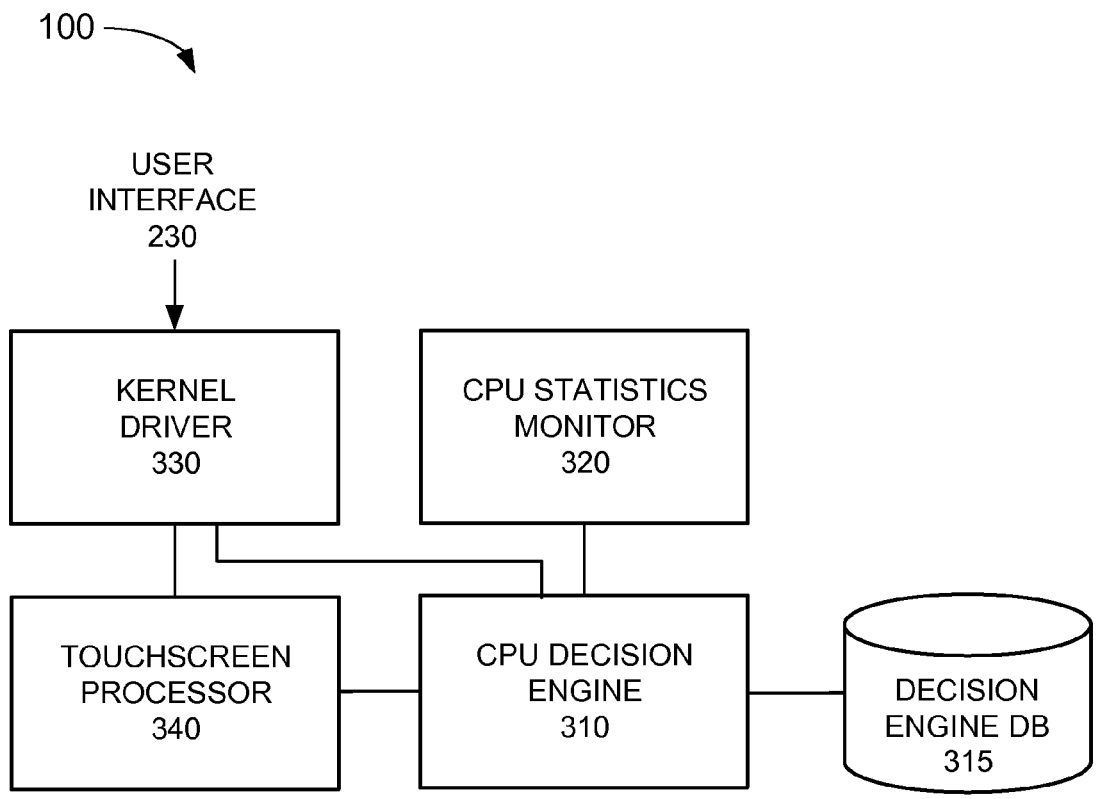
FIG. 3 is a diagram illustrating exemplary functional components of the touchscreen device of FIG. 1.

FIG. 3 is a diagram illustrating exemplary functional components of computer device 100 according to a first implementation described herein. The functional components of computer device 100 may be implemented, for example, via processing unit 210 executing instructions from memory 220. Alternatively, some or all of the functional components of computer device 100 may be implemented via hard-wired circuitry. As shown in FIG. 3, computer device 100 may include CPU decision engine 310, decision engine database (DB) 315, CPU statistics monitor 320, kernel driver 330, and touchscreen processor 340.

CPU decision engine 310 may decide how many CPUs 215 should be active at any particular time. CPU decision engine 310 may obtain processor load statistics for CPUs 215 from CPU statistics monitor 320 and may increase or decrease the number of active CPUs 215 based on the obtained processor load statistics. As an example, if the processor load for the currently active CPUs 215 has increased over a particular number of sample intervals by at least a first threshold, CPU decision engine 310 may activate one or more additional CPUs 215. As another example, if the processor load for the currently active CPUs has decreased over a particular number of sample intervals by at least a second threshold, CPU decision engine 310 may deactivate one or more of the currently active CPUs 215. The processor load for each CPU 215 may be calculated and/or averaged to arrive at a processing load for all active CPUs 215. In some implementations, if the load of one of the particular active CPUs 215 has increased/decreased, CPU decisions engine 310 may activate/deactivate one or more CPUs 215 without determining an average load for all the active CPUs 215.

Furthermore, CPU decision engine 310 may detect a touchscreen event associated with touchscreen 120. In some implementations, CPU decision engine 310 may detect the touchscreen event by receiving an indication of the touchscreen event from kernel driver 330 and/or from touchscreen processor 340. In other implementations, CPU decision engine 310 may detect the touchscreen event by checking a kernel driver input queue of kernel driver 330 at particular intervals. In some implementations, CPU decision engine 310 may activate one or more additional CPUs 215 in response to detecting a touchscreen event. For example, CPU decision engine 310 may activate one additional CPU 215 in response to detecting the touchscreen event. In other implementations, CPU decision engine 310 may determine a type of touchscreen event associated with a detected touchscreen event and may determine how many additional CPUs 215 to activate based on the type of touchscreen event. For example, a first type of gesture may result in no additional CPUs 215 being activated, while a second type of gesture may result in one additional CPU 215 being activated.

In some implementations, CPU decision engine 310 may correlate a detected touchscreen event with a minimum number of CPUs 215 that should be active. For example, a detected touchscreen event may indicate that at least two CPUs should be active. A CPU decision engine may check to see how many CPUs are active and may activate an additional CPU if only one CPU is active, and may not need to activate additional CPUs if two CPUs are already active as a result of another process.

In some implementations, CPU decision engine 310 may adjust an operating frequency of active CPUs 215 in response to the detected touchscreen event and/or based on the type of detected touchscreen event. For example, different CPUs 215 may require a different minimum operating frequency and bringing an additional CPU 215 online may require increasing the operating frequency of computer device 100. As another example, processing of a touchscreen event may require a different operating frequency and CPU decision engine 310 may adjust the operating frequency in response to the detected touchscreen event based on the required operating frequency for touchscreen events.

Decision engine DB 315 may store information relating to particular types of touchscreen events. Exemplary information that may be stored in decision engine DB 315 is described below with reference to FIG. 4.

CPU statistics monitor 320 may obtain statistics for CPUs 215. For example, CPU statistics monitor 320 may obtain processor load statistics for CPUs 215 at particular intervals, such as the percent capacity of each CPU 215 during each particular interval. CPU statistics monitor 320 may provide the obtained processor load statistics to CPU decision engine 310.

Kernel driver 330 may manage computing resources for computer device 100, including CPUs 215, memory 220, user interface 230, and/or communication interface 240. For example, kernel driver 330 may include a process that manages input and/or output requests from applications and/or other software processes and converts the input and/or output requests into processing instructions for CPUs 215. When user interface 230 detects a touchscreen event from touchscreen 120, user interface 230 may send a request to kernel driver 330 to process the touchscreen event. Kernel driver 330 may place the detected touchscreen event into a kernel driver input queue.

In some implementations, kernel driver 330 may instruct CPU decision engine 310 to bring one or more additional CPUs online in response to receiving an interrupt from a touchscreen hardware process. Thus, in some implementations, CPU decision engine 310 may not need to monitor or poll a kernel driver input queue for touchscreen events.

Touchscreen processor 340 may process particular touchscreen events. As an example, if a touchscreen event corresponds to a gesture that unlocks touchscreen 120, touchscreen processor 340 may unlock touchscreen 120. As another example, if a touchscreen event corresponds to a user moving an icon across touchscreen 120, touchscreen processor 340 may activate an animation that moves the icon across touchscreen 120. In some implementations, touchscreen processor 340 may send indication of a detected touchscreen event to CPU decision engine 310. CPU decision engine 310 may activate one or more additional CPUs 215 in response to receiving the indication and touchscreen processor 340 may make use of the one or more additional activated CPUs 215 in processing the touchscreen event.

Although FIG. 3 shows exemplary functional components of computer device 100, in other implementations, computer device 100 may include fewer functional components, different functional components, differently arranged functional components, or additional functional components than depicted in FIG. 3. Additionally or alternatively, one or more functional components of computer device 100 may perform functions described as being performed by one or more other functional components of computer device 100.

Figure 4:
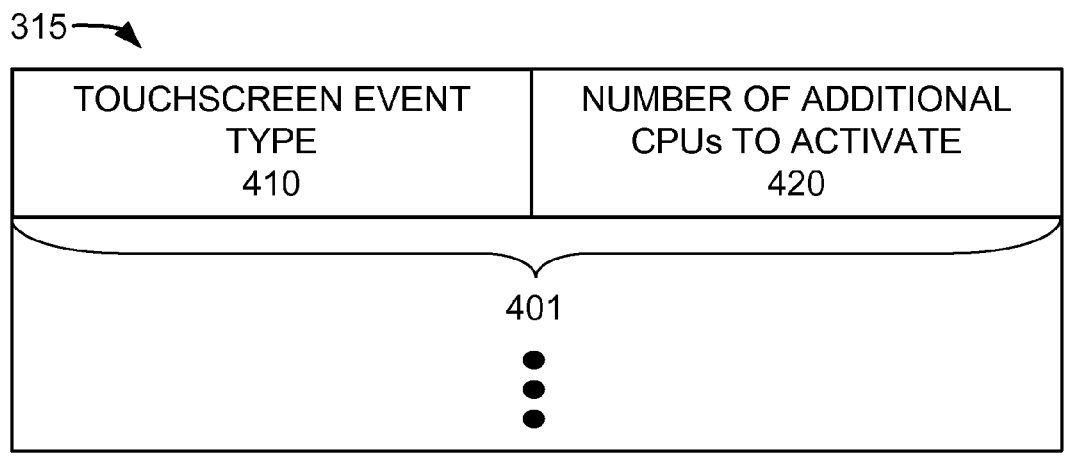
FIG. 4 is a diagram of exemplary components that may be stored in the decision engine database of FIG. 3.

FIG. 4 is a diagram of exemplary components that may be stored in decision engine DB 315. As shown in FIG. 4, decision engine DB 315 may include one or more touchscreen event type entries 401. Each touchscreen event type entry 401 may store information associated with a particular touchscreen event type. Touchscreen entry 401 may include a touchscreen event type field 410 and a number of additional CPUs 215 to activate field 420. Touchscreen event type field 410 may identify a particular touchscreen event type. Number of additional CPUs to activate field 420 may store a number of additional CPUs 215 to activate in response to detecting the particular touchscreen event type. Decision engine DB 315 may include a default touchscreen event type entry 401 that may be selected if a type of touchscreen event does not match any other entry in decision engine DB 315. For example, the default entry being selected may result in one additional CPU being activated.

In some implementations, the particular touchscreen event may correspond to a particular gesture. As an example, a first gesture may indicate that no additional CPUs 215 are to be activated and a second gesture may indicate that one additional CPU 215 is to be activated. For example, a particular gesture may be required to unlock touchscreen 120 and other types of gestures may not result in additional CPUs 215 being activated if touchscreen 120 is locked. As another example, a first gesture may indicate a first number of additional CPUs should be activated and a second gesture may indicate a second number of additional CPUs should be activated. For example, a first gesture may result in an action that is associated with a processor load that can be met with one additional CPU being activated, while a second gesture may result in an action that is associated with a processor load that requires more than one additional CPU being activate (e.g, two CPUs 215).

In some implementations, the particular touchscreen event may correspond to detecting a particular number of fingers or contact points with the touchscreen. For example, one detected finger may result in activation of one additional CPU, while four detected fingers may result in all additional CPUs (e.g., four CPUs) being activated.

In some implementations, the particular touchscreen event may correspond to a particular area of the touchscreen being activated. For example, a first touch screen area, associated with a particular application icon and/or particular function, may result in activation of a first number of additional CPUs and a second touch screen area, associated with a different application icon and/or function, may result in an activation of a second number of additional CPUs.

In some implementations, the particular type of touchscreen event may include an indication as to whether the detected touchscreen event is associated with a particular processor load. For example, a first type of touchscreen event may correspond to a touchscreen event during a first processor load, which may indicate that a first number of additional CPUs are to be activated; and a second type of touchscreen event may correspond to a touchscreen event during a second processor load, which may indicate a second number of additional CPUs are to be activated.

In some implementations, the particular type of touchscreen event may include an indication as to whether the detected touchscreen event is associated with a particular type of incoming message. For example, a first type of touchscreen event may correspond to a touchscreen event detected in connection with an incoming telephone call or multimedia call, a second type of touchscreen event may correspond to a touchscreen event detected in connection with a received short message service (SMS) message, a third type of touchscreen event may correspond to a touchscreen event detected in connection with an incoming video stream, etc. As an example, a touchscreen event may result in one additional CPU 215 being activated. However, if the touchscreen event is detected while an incoming telephone call or incoming video stream is detected, additional CPUs 215 may be activated (e.g., two CPUs).

In some implementations, the particular type of touchscreen event may include an indication as to whether the detected touchscreen event is associated with a particular application being activated. For example, some applications may be more computationally demanding and may require additional CPUs 215 to be activated. Thus, a first type of touchscreen event may correspond to a touchscreen event detected in connection with a first application being activated (e.g. the user clicks on an icon of the first application) and a second type of touchscreen event may correspond to a touchscreen event detected in connection with a second application being activated (or no application being activated).

In some implementations, the particular type of touchscreen event may include an indication as to whether the detected touchscreen event is associated with a particular level of battery life. For example, if the battery life is below a particular threshold, additional CPUs 215 may not be activated in order to conserve battery life. Thus, a first type of touchscreen event may correspond to a touchscreen event detected while the battery life is below a particular threshold and a second type of touchscreen event may correspond to a touchscreen event detected while the battery life is above the particular threshold.

Although FIG. 4 shows exemplary components of decision engine DB 315, in other implementations, decision engine DB 315 may include fewer components, different components, differently arranged components, or additional components than depicted in FIG. 4.

Figure 5:
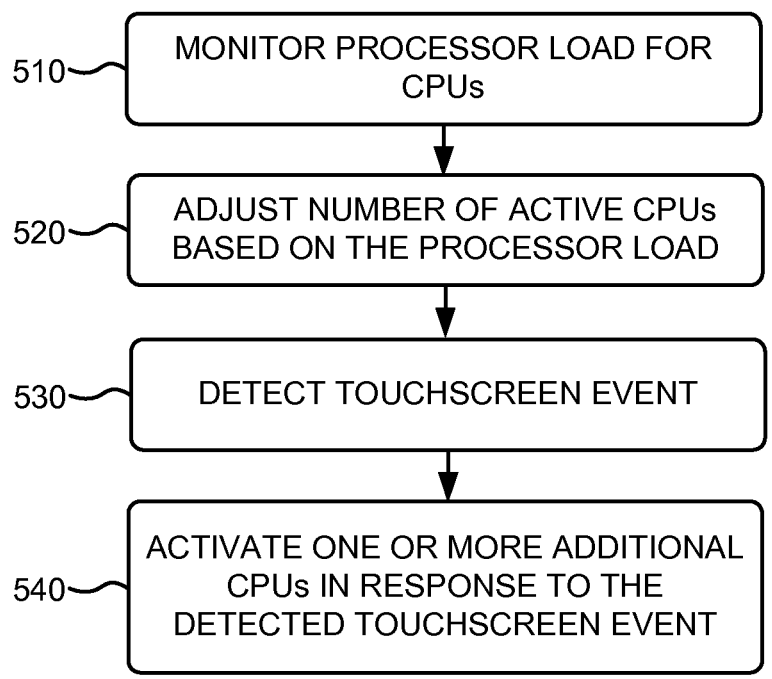
FIG. 5 is a flowchart of a first exemplary process for pre-emptive CPU activation according to an implementation described herein.

FIG. 5 is a flowchart of a first exemplary process for preemptive CPU activation according to an implementation described herein. In some implementations, the process of FIG. 5 may be performed by computer device 100. In other implementations, some or all of the process of FIG. 5 may be performed by another device or a group of devices separate from computer device 100 and/or including computer device 100.

The process of FIG. 5 may include monitoring a processor load for CPUs (block 510) and adjusting the number of active CPUs based on the processor load (block 520). For example, CPU statistics monitor 320 may monitor the processor load for the active CPUs 215 and may provide statistics about each individual processor load, or the overall (e.g., averaged) processor load, to CPU decision engine 310. CPU decision engine 310 may average the processor load over a particular number of samples and may determine whether to increase or decrease the number of active CPUs 215. Thus, if the processor load increases over the particular number of samples, CPU decision engine 310 may increase the number of active CPUs 215 and if the processor load decreases over the particular number of samples, CPU decision engine 310 may decrease the number of active CPUs 215.

A touchscreen event may be detected (block 530) and one or more additional CPUs may be activated in response to the detected touchscreen event (block 540). In some implementations, CPU decision engine 310 may receive an indication from kernel driver 330 and/or from touchscreen processor 340 that a touchscreen event has been received from touchscreen 120 via user interface 230. In other implementations, CPU decision engine 310 may monitor a kernel driver input queue associated with kernel driver 330 at particular intervals to determine whether a touchscreen event has been placed in the kernel driver input queue. For example, CPU decision engine 310 may monitor the processing load using a first interval and may monitor a kernel driver input queue using a second interval, wherein the second interval is smaller than the first interval.

In response to detecting the touchscreen event, CPU decision engine 310 may activate one or more additional CPUs 215. In some implementations, CPU decision engine 310 may activate one additional CPU 215. In other implementations, CPU decision engine 310 may activate more than one additional CPU 215. In some implementations, CPU decision engine 310 may determine how many CPUs should be active based on the detected touchscreen event. For example, CPU decision engine 310 may determine that two CPUs 215 should be active and may determine how many CPUs 215 are active. If two CPUs 215 are already active as a result of another process, such as, for example, an application running in the background, CPU decision engine 310 may determine that enough computing power is activated and may not need to activate any additional CPUs 215.

In some implementations, an operating frequency may be adjusted in response to the detected touchscreen event. For example, CPU decision engine 310 may adjust an operating frequency based on a frequency requirement associated with an activated CPU 215 and/or based on a frequency requirement associated with the detected touchscreen event.

Figure 6:
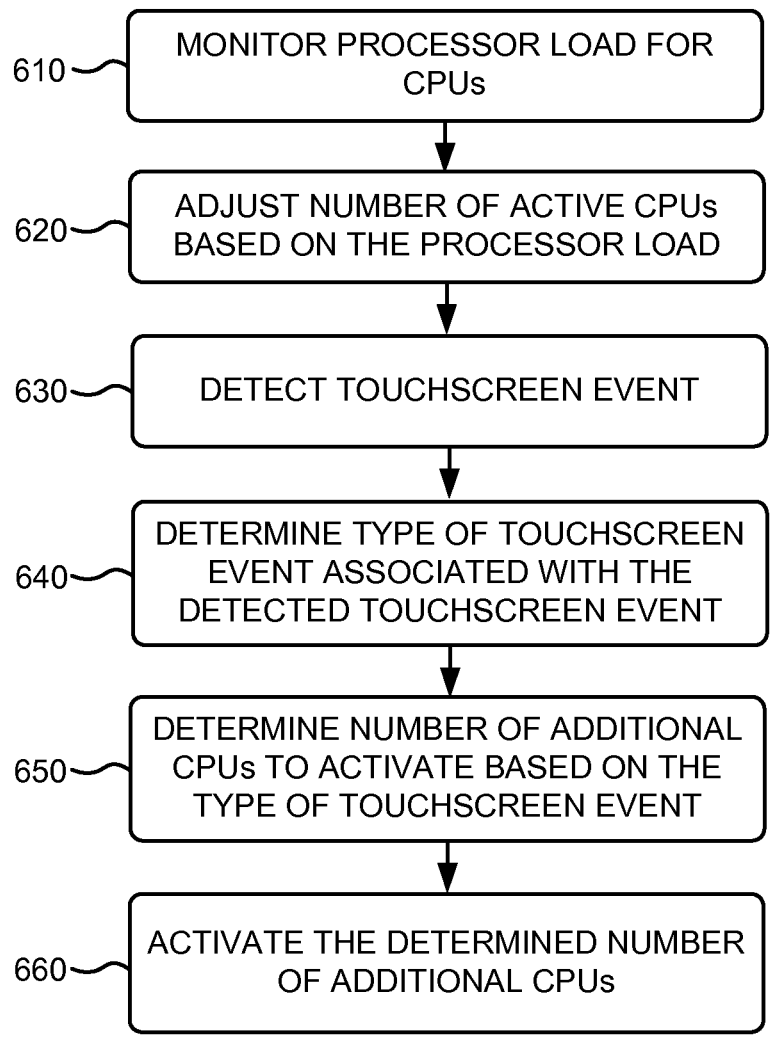
FIG. 6 is a flowchart of a second exemplary process for pre-emptive CPU activation according to an implementation described herein.

FIG. 6 is a flowchart of a second exemplary process for pre-emptive CPU activation according to an implementation described herein. In some implementations, the process of FIG. 6 may be performed by computer device 100. In other implementations, some or all of the process of FIG. 6 may be performed by another device or a group of devices separate from computer device 100 and/or including computer device 100.

The process of FIG. 6 may include monitoring a processor load for CPUs (block 610) and adjusting the number of active CPUs based on the processor load (block 620). For example, CPU statistics monitor 320 may monitor the processor load for the active CPUs 215 and may provide statistics about the processor load to CPU decision engine 310. CPU decision engine 310 may average the processor load for the active CPUs 215 over a particular number of samples and may determine whether to increase or decrease the number of active CPUs 215. Thus, if the processor load has increased over the samples, CPU decision engine 310 may increase the number of active CPUs 215 and if the processor load has decreased over the samples, CPU decision engine 310 may decrease the number of active CPUs 215.

A touchscreen event may be detected (block 630). In some implementations, CPU decision engine 310 may receive an indication from kernel driver 330 and/or from touchscreen processor 340 that a touchscreen event has been received from touchscreen 120 via user interface 230. In other implementations, CPU decision engine 310 may monitor a kernel driver input queue associated with kernel driver 330 at particular intervals to determine whether a touchscreen event has been placed in the kernel driver input queue.

A type of touchscreen event, associated with the detected touchscreen event, may be determined (block 640). As an example, CPU decision engine 310 may determine a type of touchscreen event based on information obtained from kernel driver 330 and/or touchscreen processor 340, such as a type of gesture associated with the touchscreen event, a particular area of the touchscreen, a number of detected fingers and/or contact points, and/or another type of touchscreen event. As another example, CPU decision engine 310 may determine an event or state associated with computer device 100 in connection with the touchscreen event, such as the most recently obtained processor load statistics, whether the touchscreen event is associated with a particular type of incoming message, whether the touchscreen event is associated with a particular application being activated, the current battery life of computer device 100, and/or another type of event or state associated with computer device 100.

A number of additional CPUs to activate, based on the type of touchscreen event, may be determined (block 650) and the determined number of additional CPUs may be activated (block 660). CPU decision engine 310 may identify a touchscreen event type entry 401 in decision engine DB 315 and may determine how many additional CPUs 215 should be activated based on information stored in the selected entry. If the determined type of touchscreen event cannot be matched with an entry in decision engine DB 315, a default entry may be selected. CPU decision engine 310 may activate the determined number of additional CPUs 215 or may check whether a requirement of a minimum number of active CPUs 215 is satisfied.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computing device, comprising:
   monitoring, by the computing device, a processing load for a plurality of central processing units at particular intervals;

adjusting, by the computing device, a number of active central processing units, of the plurality of central processing units, based on the monitored processing load;

detecting, by the computing device, a touchscreen event associated with a touchscreen of the computing device;

determining, by the computing device, a type of touchscreen event associated with the detected touchscreen event;

determining whether to activate the one or more additional central processing units based on the determined type of touchscreen event; and activating, by the computing device, one or more additional central processing units, of the plurality of central processing units, in response to determining to activate the one or more additional central processing units.

2. The method of claim 1, wherein detecting the touchscreen event includes:
receiving an indication from a touchscreen software process that the touchscreen event was detected.

3. The method of claim 1, wherein detecting the touchscreen event includes:
monitoring a kernel driver queue at particular intervals; and
detecting an indication of the touchscreen event in the kernel driver queue.

4. The method of claim 1, wherein determining the type of touchscreen event associated with the detected touchscreen event includes:
determining a type of gesture associated with the detected touchscreen event.

5. The method of claim 1, wherein determining the type of touchscreen event associated with the detected touchscreen event includes:
determining that the detected touchscreen event is associated with a particular area of the touchscreen.

6. The method of claim 1, wherein determining the type of touchscreen event associated with the detected touchscreen event includes:
determining that the detected touchscreen event is associated with a particular type of incoming message.

7. The method of claim 1, wherein determining the type of touchscreen event associated with the detected touchscreen event includes:
determining that the detected touchscreen event is associated with a particular application being activated.

8. The method of claim 1, further comprising:
adjusting an operating frequency of the computing device, in response to detecting the touchscreen event.

9. A computing device comprising:
a touchscreen; and
logic configured to:
monitor a processing load for a plurality of central processing units at particular intervals;
adjust a number of active central processing units, of the plurality of central processing units, based on the monitored processing load;
detect a touchscreen event associated with the touchscreen;
determine a type of touchscreen event associated with the detected touchscreen event;
determine whether to activate the one or more additional central processing units based on the determined type of touchscreen event; and
activate one or more additional central processing units, of the plurality of central processing units, in response to determining to activate the one or more additional central processing units.

10. The computing device of claim 9, wherein, when detecting the touchscreen event, the logic is further configured to:
receive an indication from a touchscreen software process that the touchscreen event was detected.

11. The computing device of claim 9, wherein, when detecting the touchscreen event, the logic is further configured to:
monitor a kernel driver queue at particular intervals; and
detect an indication of the touchscreen event in the kernel driver queue.

12. The computing device of claim 9, wherein, when determining the type of touchscreen event associated with the detected touchscreen event, the logic is further configured to:
determine a type of gesture associated with the detected touchscreen event.

13. The computing device of claim 9, wherein, when determining the type of touchscreen event associated with the detected touchscreen event, the logic is further configured to:
determine that the detected touchscreen event is associated with a particular area of the touchscreen.

14. The computing device of claim 9, wherein, when determining the type of touchscreen event associated with the detected touchscreen event, the logic is further configured to:
determine that the detected touchscreen event is associated with a particular type of incoming message.

15. The computing device of claim 9, wherein, when determining the type of touchscreen event associated with the detected touchscreen event, the logic is further configured to:
determine that the detected touchscreen event is associated with a particular application being activated.

16. The computing device of claim 9, wherein, when determining the type of touchscreen event associated with the detected touchscreen event, the logic is further configured to:
determine that the detected touchscreen event is associated with a particular level of battery life.

17. A computing device comprising:
a touchscreen; and
logic configured to:
monitor a processing load for at least one of a plurality of central processing units using a first particular interval;
adjust a number of active central processing units, of the plurality of central processing units, based on the monitored processing load;
monitor a kernel driver queue using a second particular interval, wherein the second particular interval is smaller than the first particular interval;
detect an indication of the touchscreen event in the kernel driver queue;
determine a type of touchscreen event associated with the detected indication of the touchscreen event;
determine whether to activate one or more additional central processing units, of the plurality of central processing units, based on the determined type of touchscreen event; and
activate one or more additional central processing units, of the plurality of central processing units, in response to determining to activate the one or more additional central processing units.

18. The computing device of claim 17, wherein the logic is configured to determine the type of touchscreen event, the logic is configured to determine at least one of:
a type of gesture associated with the detected touchscreen event,
whether the detected touchscreen event is associated with a particular area of the touchscreen, a number of detected fingers or contact points associated with the detected touchscreen event,
whether the detected touchscreen event is associated with a particular type of incoming message,
whether the detected touchscreen event is associated with a particular application being activated, or
whether the detected touchscreen event is associated with a particular level of battery life.

\* \* \* \* \*